Dec. 16, 1930.   M. H. SHOENBERG ET AL   1,785,397
AUTOMOBILE SIGNALING SYSTEM
Filed Oct. 5, 1927
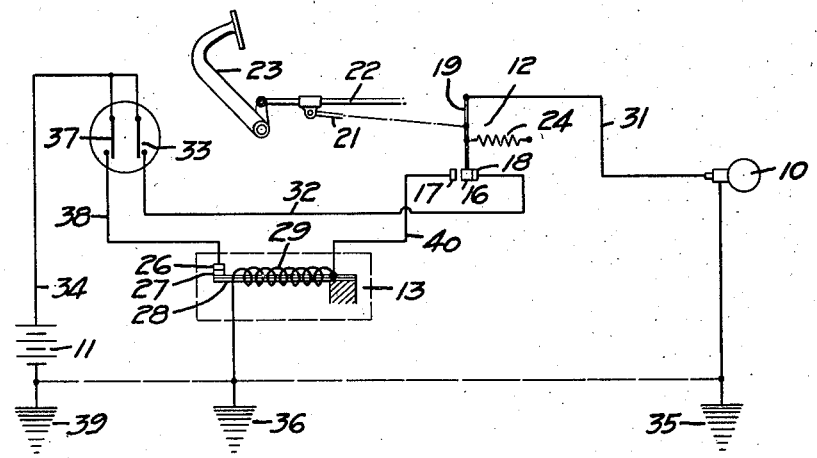
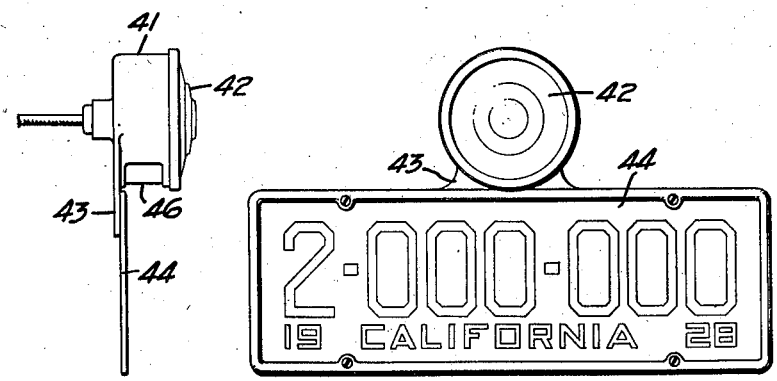
INVENTOR
Milton H. Shoenberg
BY Lester Schon
White, Prost & Fryer
ATTORNEYS Patented Dec. 16, 1930

1,785,397

UNITED STATES PATENT OFFICE

MILTON H. SHOENBERG AND LESTER SCHON, OF SAN FRANCISCO, CALIFORNIA; SAID SCHON ASSIGNOR TO SAID SHOENBERG

AUTOMOBILE SIGNALING SYSTEM

Application filed October 5, 1927. Serial No. 224,123.

This invention relates generally to electrical systems for effecting visual signaling, and is especially adapted for use on motor vehicles.

It is an object of this invention to devise a simple and effective signaling system which may be used in conjunction with the ordinary tail light of an automobile, thus dispensing with the use of a separate stop light.

It is a further object of this invention to utilize an electro-thermal circuit interrupter in conjunction with an automobile stop signaling system of the type which utilizes the ordinary automobile tail light.

It is a further object of this invention to devise a system which will utilize the ignition switch of an automobile for controlling a flashing signal lamp, in conjunction with other means which will permit normal continuous burning of the lamp so that it may function as a tail light.

It is a further object of this invention to combine a stop signal for an automobile with a tail light constructed in such a way as to insure the stop signal being operative at all times, and to utilize an interrupting device with the system for flashing the tail light, the interrupting device being so constructed and combined with the system so as to insure burning of the tail light even tho the interrupting device becomes inoperative.

Further objects of the invention will appear from the following description in which we have set forth the preferred embodiment of our invention. It is to be understood that the appended claims are to be accorded a range of equivalents consistent with the state of the prior art.

Referring to the drawings:

Figure 1 is a circuit diagram illustrating diagrammatically the system of this invention.

Fig. 2 is a side elevational view of a tail light suitable for incorporation with the system shown in Fig. 1.

Fig. 3 is a rear elevational view of the tail light shown in Fig. 2.

The invention may be briefly outlined as comprising a visual electrical signaling means, as for example an electrical lamp, which is adapted to be energized from a suitable source of current such as the standard 6 or 12 volt storage battery of an automobile. For controlling current supplied to the lamp a two-way switch is provided which is usually actuated by some member, such as the brake pedal, which is moved by an operator to control movements of the automobile. For the two positions of this switch, there are two current paths thru which current may flow from the battery for energizing the lamp. In one current path a circuit interrupting device is inserted so that for this position of the switch, the signal lamp will be repeatedly flashed. In the other current path we prefer to insert a manually operable switch, which when closed will normally keep the signal lamp burning steadily. Thus when the brake pedal or other member controlling the two-way switch is in normal position during running of the automobile, the signal lamp will be either entirely disconnected, as for driving during day time, or will be burned steadily as for night driving. When the brake pedal is depressed as during stopping of the automobile, the circuit interrupting device is effective to repeatedly flash the lamp, thus indicating to an automobile in the rear that a stop is being made. The circuit interrupting device which we employ is preferably of the electrical thermal type and operates continuously as long as the ignition switch of the automobile is "on".

Referring to the drawing for a more complete description of the invention, there is shown a suitable electrical signaling device such as an electrical lamp 10 which is adapted to be energized from a suitable source of current such as a battery 11. This battery may be the usual 6 or 12 volt storage battery used upon ignition and starting systems of automobiles. Interposed between the lamp 10 and the battery 11, there is a switch 12 adapted to be controlled by an operator, and an automatic controlling device 13 adapted to supply recurrently varying current to the lamp for flashing the same.

The manually operable switch 12 may take a number of different forms, but for the specific system which we have disclosed, it is preferably of the two-way type for controlling two different current paths. For example we have shown a switch 12 comprising a relatively movable contact 16 adapted to cooperate with a pair of relatively stationary contacts 17 and 18, the movable contact 16 being carried by a movable switch member 19. This switch may be directly actuated by an operator, but is preferably connected to a control member of an automobile so as to be actuated automatically during the course of driving the car. For example we have shown a mechanical connection 21 between the switch member 19 and a brake rod 22, this brake rod being of course moved by the usual foot brake pedal 23. The switch 12 is preferably biased toward its normal position, say in a position to keep contact 16 closed with respect to contact 18, by simple means such as a biasing spring 24.

The automatic controlling or circuit interrupting device 13 preferably utilizes a pair of relatively movable contacts 26 and 27. These contacts are adapted to be recurrently opened and closed by an electrical thermal motive element, as for example a bi-metallic strip 28 carrying one of the contacts 26 and 27 upon its free end. Heat is supplied to the bi-metallic strip 28 as by means of a resistance 29 wound about the strip and in close thermal contact with the same.

With the brake pedal 23 in normal position corresponding to normal running of the automobile, contacts 16 and 18 of switch 12 are closed. During night driving it is necessary to have a lamp burning in the rear of an automobile, both for the purpose of warning approaching motorists and in order to illuminate the automobile license plate. The use of a two-way switch 12 makes it possible to utilize the lamp 10 both for the purpose of signaling a brake application to a following motorist, and for taking the place of the usual automobile tail light. Thus one conductor 31 leading from lamp 10 is connected to the switch contact 16, and contact 18 is connected by means of conductor 32 to one contact of a manually operable switch 33, the other contact of this switch being connected to the positive terminal of battery 11 as by means of conductor 34. The other conductor supplying lamp 19 may be returned to the battery 11 or may be provided with a ground connection 35 to the automobile frame. The switch 33 may be the usual lighting switch provided upon the instrument board of automobiles. When this switch is closed and contacts 16 and 18 are likewise closed, the lamp 10 is burned steadily.

When the brake pedal 23 is depressed and switch contacts 16 and 17 are closed, another current path is provided thru the circuit interrupter device 13. Preferably but not essentially, this interrupting device is operated continuously after opening of the switch of the automobile, or upon closing of a switch which controls or renders the vehicle motor active or inactive. Thus one terminal of resistance 29 has been shown as connected to the negative terminal of battery 11 as by means of ground connection 36, while the other terminal is shown grounded to the bi-metallic strip 28 and thus to the contact 27. Contact 26 is connected to one contact of the automobile engine ignition switch 37, by means of conductor 38, the other contact of the ignition switch being connected to battery 11 by means of the conductor 34. While the circuits for supplying the lamp 10 may be completed by a separate conductor returning to the battery 11, we preferably simplify the system by providing battery 11 with the usual ground connection 39.

In Figs. 2 and 3 we have indicated a suitable form of tail lamp which may be used in the system described above. For example this lamp has an outer casing 41 having a front lens 42, this lens being usually colored red. In conjunction with the casing 41, there is usually supplied a bracket 43 for holding a license plate 44, and the lower portion of the lamp casing is provided with a window 46 for illuminating the license plate.

In operating this system upon closing switch 37 for starting the automobile engine, a circuit is completed which energizes the resistance 29 of the circuit interrupter 13. This circuit may be traced from battery 11, by way of conductor 34, ignition switch 37, conductor 38, normally closed contacts 26 and 27, bi-metallic strip 28, resistance 29, and ground connection 36. The heating of resistance 29 flexes the bi-metallic strip 28 to open the contacts 26 and 27, thus interrupting flow of current thru the resistance 29. The bi-metallic strip 28 is then permitted to cool to again close contacts 26 and 27. Contacts 26 and 27 are therefore continuously opened and closed by energization and deenergization of the resistance 29. If the brake pedal 23 is now depressed to apply the automobile brakes, contacts 16 and 17 are closed and a circuit is completed which supplies recurrently varying current to the lamp 10 to flash the same, thus indicating stopping of the automobile to other motorists. This circuit may be traced as follows:—from battery 11 thru conductor 34, ignition switch 37, conductor 38, contacts 26 and 27, conductor 40, contacts 16 and 17, conductor 31, lamp 10, and from thence back to the battery 11 thru ground connection 35. Since the contacts 26 and 27 are to be recurrently opened and closed, the lamp 10 will be accordingly flashed on and off. During night driving when it is desired to keep the lamp 10 burning steadily, switch 33 is closed which completes a circuit which may be traced as follows:—from battery 11, conductor 34, switch 33, conductor 32, switch contacts 16 and 18, conductor 31, lamp 10, and from thence back to the battery 11 thru ground connection 35. If the brake pedal 23 is depressed while switch 33 is closed, switch contacts 16 and 18 are opened to interrupt supplying of current thru switch 33, and closing of switches 16 and 17 causes the lamp to flash as explained above.

The system which we have described above is of extreme simplicity and may be used over long periods without requiring replacement of the parts. The use of a single lamp both for the automobile tail light and for signaling purposes, eliminates the necessity of having a separate stop or signal lamp. The use of a thermal type of circuit interrupting device makes it possible to dispense with more expensive and less reliable mechanically driven devices. Several features of safety are also inherent in the system. For example an automobile user will not be apt to neglect replacing a burned out lamp since the laws of most States require a tail light to be displayed during night driving. Furthermore if the resistance 29 of the circuit interrupting device should become burned out or open circuited, contacts 26 and 27 will remain closed and the lamp 10 will not be de-energized when the brake pedal 23 is depressed.

We claim:

1. In an automobile signaling system in combination, an ignition switch, and a thermostatic flasher switch having its heating coil and normally closed contacts in series with said ignition switch, a signal lamp and a two-way driver operated switch connected to said lamp and having front and back contacts, said back contacts being normally closed and said front contacts being normally open and moved to closed position upon application of the brakes to connect said lamp in parallel with said coil to flash said lamp and a manual switch controlling the circuit to said lamp through said back contact for continuous lighting of said lamp.

2. In a signaling system adapted to be used with a motor vehicle having an ignition switch, a signal lamp, a thermostatic flasher switch having its heating coil and normally closed contacts connected in series with said ignition switch, a driver operated switch having front and back contacts and connected to said lamp, said front contacts connected to said heating coil so that said signal lamp is connected in parallel with said coil to flash said lamp upon operation of said driver operated switch in applying the brakes, and a separate manual switch connected to said back contact for controlling the lamp circuit independently of said thermostatic switch.

3. In an automobile signaling system in combination, an ignition switch and a thermostatic flasher switch having its heating coil and normally closed contacts connected in series with said ignition switch to a source of current, a brake operated switch having intermediate, front and back contacts, said intermediate contact normally biased to said back contact, a manual switch for connecting said source to said back contact, said front contact connected to said thermostatic switch between its contacts and coil, a signal lamp connected between said intermediate contact and the end of said coil which is connected to said source.

4. In an automobile signaling system, an ignition switch, a signal lamp and a thermostatic flasher switch having a heating coil, the heating coil and contacts of said thermostatic switch being connected in series with said ignition switch, a manual switch for normally controlling the circuit of the signal lamp and a brake operated switch controlling the manual switch circuit and moved to connect the signal lamp in parallel with the heating coil of the thermostatic switch upon application of the brakes.

In testimony whereof, we have hereunto set our hands.

MILTON H. SHOENBERG.
LESTER SCHON.